Figure 1:
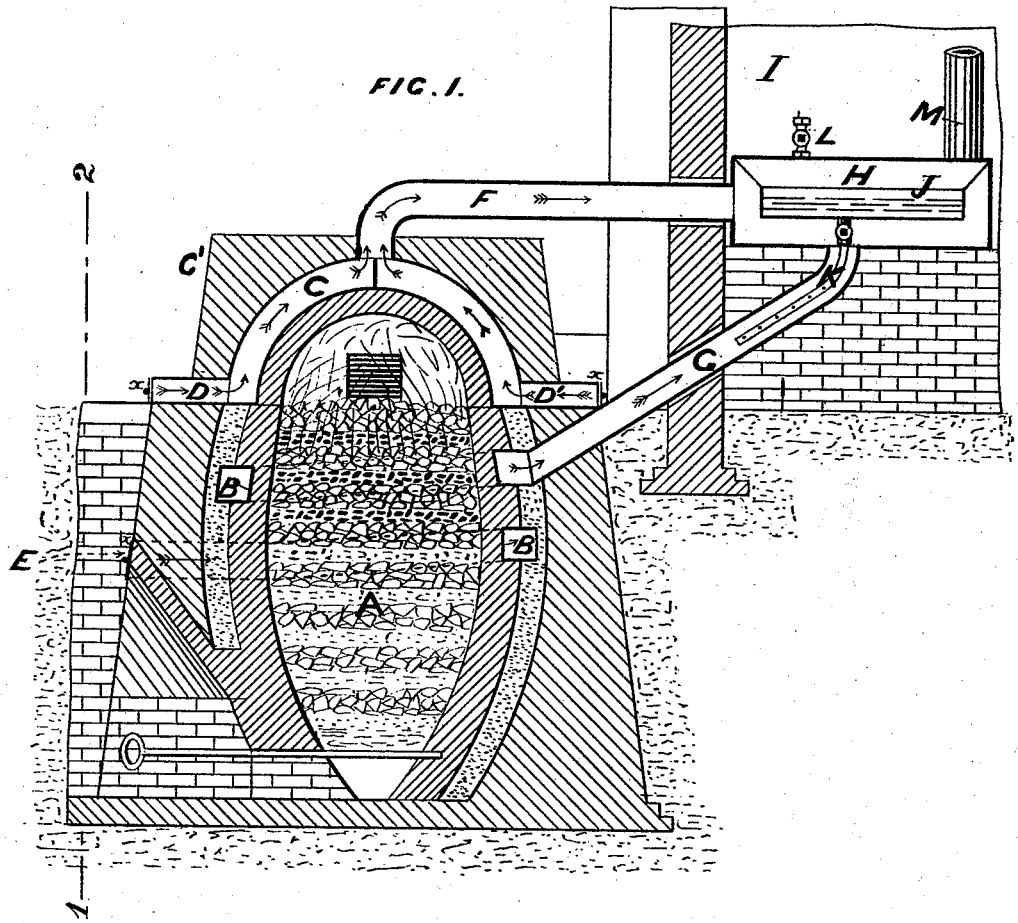

3 Sheets—Sheet 1.

J. T. TRENCH.
HEATERS FOR GREEN-HOUSES.

No. 184,201. Patented Nov. 7, 1876.

Witnesses.
John Cowan
John Hurley

Inventor
John Townsend Trench.

3 Sheets—Sheet 2.
J. T. TRENCH.
HEATERS FOR GREEN-HOUSES.
No. 184,201. Patented Nov. 7, 1876.
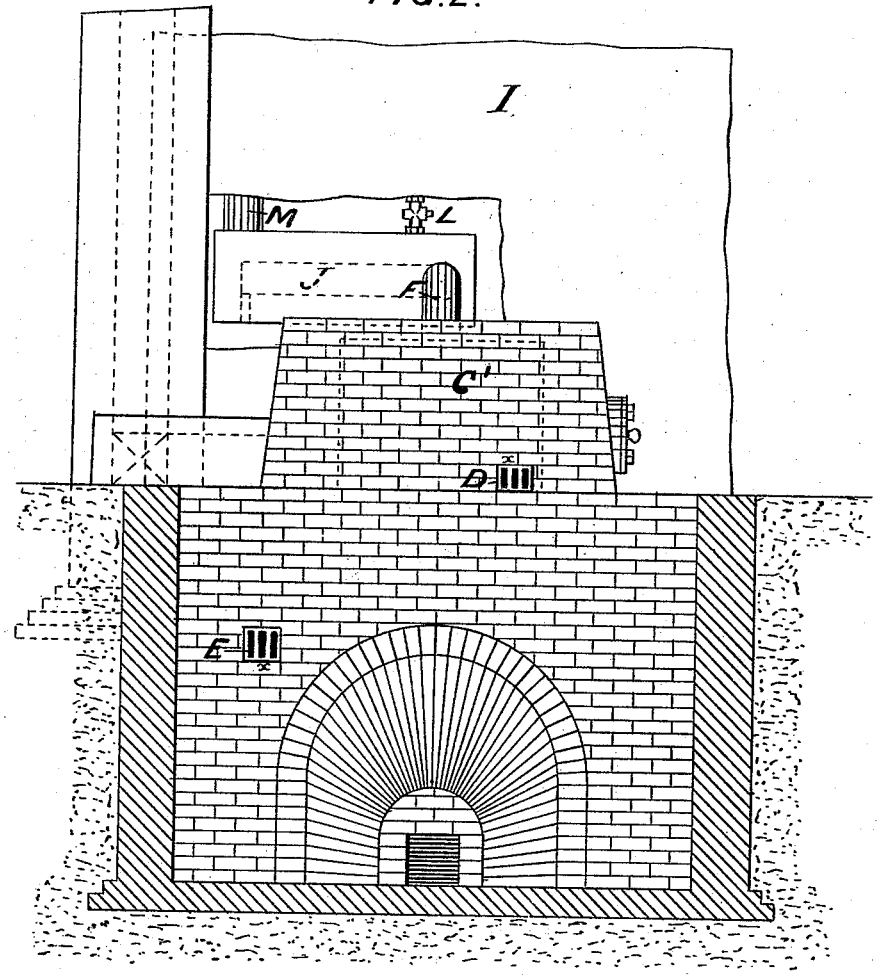

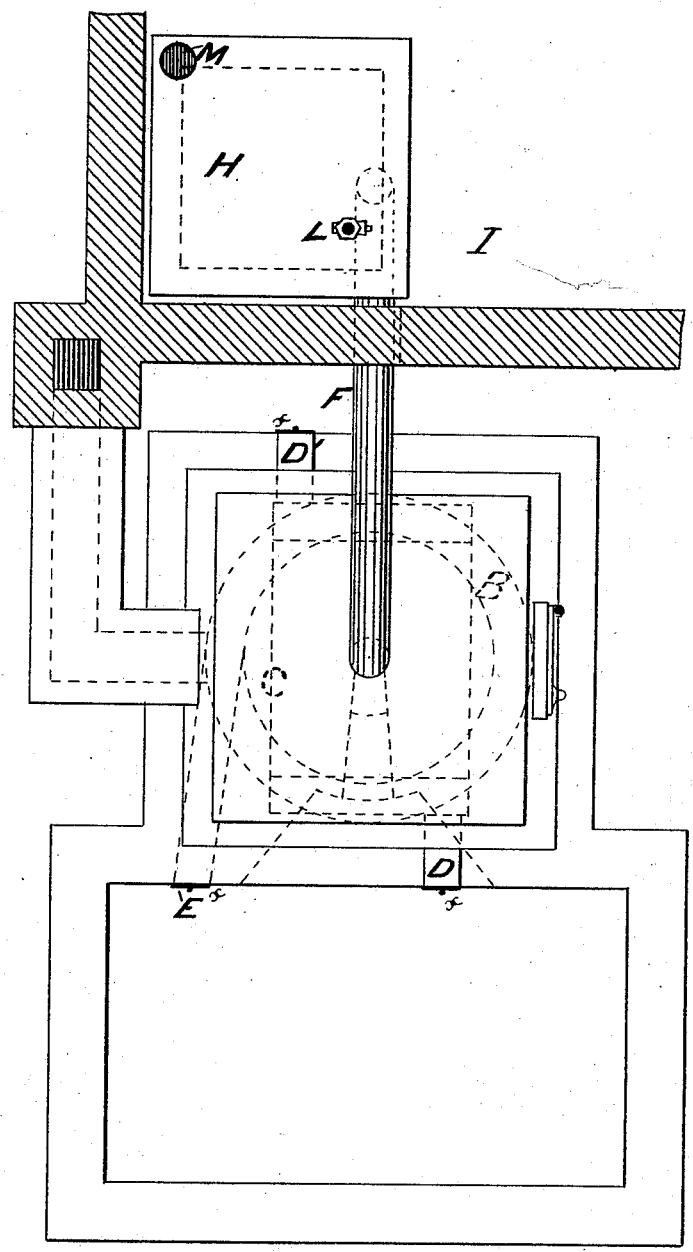

UNITED STATES PATENT OFFICE.

JOHN TOWNSEND TRENCH, OF KENMARE, IRELAND.

IMPROVEMENT IN HEATERS FOR GREEN-HOUSES.

Specification forming part of Letters Patent No. 184,201, dated November 7, 1876; application filed September 26, 1876.

*To all whom it may concern:*

Be it known that I, JOHN TOWNSEND TRENCH, of Kenmare, in the county of Kerry, Ireland, have invented certain Improved Apparatus for Heating Green-Houses and other Buildings, of which the following is a specification:

The object of my invention is to utilize the waste heat from limekilns by applying it to the warming of green-houses and other buildings, in the manner described hereafter.

In the accompanying drawing, Figure 1, Sheet 1, is a vertical section of a structure illustrating my invention; Fig. 2, Sheet 2, a front view; and Fig. 3, Sheet 3, a plan view.

A represents the chamber of a limekiln, in the inner wall of which is arranged an air-flue, B, of fire-clay or other appropriate material, the flue being, in the present instance and by preference, of the spiral form indicated by dotted lines in Fig. 1, and having an inlet pipe or passage, E, and outlet-pipe G. On the top of the kiln, and spanning the chamber, is a structure containing an air flue or chamber, C, which is, in the present instance, of a semi-cylindrical form, and which has inlets D D' and an outlet-pipe, F.

The kiln has the usual drawing and lighting opening at the bottom, and on one side of the structure C' there is an opening communicating with an adjoining chimney, and at the opposite side a suitable feed-opening, provided with a door.

The air which traverses the flue B is heated by the burning fuel in the kiln, and that which passes through the chamber C derives its heat from the products of combustion which impinge against the inside of the structure before they pass off to the chimney.

The two volumes of heated air pass through the pipes F and G and into the box H, situated within or near the green-house or other building to be heated, and within this box is a pan or tray containing water for moistening the heated air before it passes off through the pipe M into the green-house, or from the pipe M into distributing flues or passages prior to admission into the green-house.

The box H is furnished with a faucet or valve, L, through which cold air may be admitted to the heated air when circumstances require such a mixture. In order to still further moisten the heated air, a perforated pipe furnished with a suitable valve or faucet may extend from the pan J into the pipe or passage G, the water falling through the perforations into the pipe G, where it is converted into vapor, which is taken up by the heated air as it passes through the said pipe into the box.

Suitable valves or dampers x may be arranged at the mouths of the inlet-pipes for regulating the admission of air to the air-heating flues and chambers.

I claim as my invention—

1. The combination of a limekiln, the air-heating chamber B, its inlet and outlet pipe G, communicating with the distributing-pipes of the green-house or other building to be heated, all as set forth.

2. The combination of a limekiln, the air-heating chamber B, and a heating-chamber on the top of the kiln, both chambers communicating with the distributing-pipes of the green-house or other building to be heated, all as specified.

3. The combination of the kiln, its air-heating chamber or chambers, or flues, with the receiving-box H, and the water-reservoir therein.

JOHN TOWNSEND TRENCH.

In presence of—
  LEWIS RICHMOND,
  JOHN COWAN.